(12) United States Patent
Lei et al.

(10) Patent No.: US 11,948,534 B2
(45) Date of Patent: *Apr. 2, 2024

(54) DISPLAY CYCLE CONTROL SYSTEM

(71) Applicant: ATI TECHNOLOGIES ULC, Markham (CA)

(72) Inventors: Jun Lei, Markham (CA); Syed Athar Hussain, Markham (CA); David I. J. Glen, Markham (CA); Rajeevan Panchacharamoorthy, Markham (CA); Fatemeh Amirnavaei, Markham (CA); David Galiffi, Markham (CA); Arshad Rahman, Markham (CA); Boris Ivanovic, Markham (CA)

(73) Assignee: ATI Technologies ULC, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/877,540

(22) Filed: Jul. 29, 2022

(65) Prior Publication Data
US 2023/0118079 A1  Apr. 20, 2023

Related U.S. Application Data

(63) Continuation of application No. 16/889,318, filed on Jun. 1, 2020, now Pat. No. 11,430,410.

(51) Int. Cl.
*G09G 5/12* (2006.01)
*G06F 3/14* (2006.01)

(52) U.S. Cl.
CPC ............ *G09G 5/12* (2013.01); *G06F 3/1431* (2013.01); *G06F 3/1446* (2013.01); *G09G 2360/04* (2013.01)

(58) Field of Classification Search
CPC ........ G06F 3/14; G06F 3/1431; G06F 3/1438; G06F 3/1446; G06F 3/147; G06F 3/3265; G09G 2310/061; G09G 2310/08; G09G 2330/021; G09G 2340/0435; G09G 2360/04; G09G 2360/06; G09G 2360/08;
(Continued)

(56) References Cited

U.S. PATENT DOCUMENTS 5,963,200 A * 10/1999 Deering ............... H04N 13/161
348/E13.059
6,297,817 B1 * 10/2001 Larson .................. G06F 3/1446
345/1.1
(Continued)

OTHER PUBLICATIONS

International Preliminary Report on Patentability issued in Application No. PCT/IB2021/054771, dated Dec. 6, 2022, 7 pages.
(Continued)

*Primary Examiner* — Prabodh M Dharia (57) ABSTRACT

A display system modifies display cycles of one or more displays to perform a system operation while avoiding visual perturbations at the one or more displays. The display system modifies, synchronizes, or both, blanking periods of the one or more displays such that blanking periods equal or exceed a blackout duration and overlap for at least the blackout duration. Then the system performs the system operation during an overlapping portion of the one or more blanking periods, where the system operation reduces availability of display data at the one or more displays.

20 Claims, 6 Drawing Sheets

(58) Field of Classification Search
CPC ...... G09G 2360/12; G09G 5/12; G09G 5/363; H04N 5/12
USPC ................. 345/1.1, 213, 501, 502; 715/700; 359/290
See application file for complete search history.

(56) References Cited

U.S. PATENT DOCUMENTS

| | | | | |
|---|---|---|---|---|
| 2003/0137528 A1* | 7/2003 | Wasserman | ........... | G06F 3/1431 715/700 |
| 2004/0012612 A1* | 1/2004 | Chan | ...................... | G09G 5/006 345/619 |
| 2007/0159412 A1* | 7/2007 | Dai | ....................... | G06F 3/1438 345/1.1 |
| 2007/0206018 A1* | 9/2007 | Bajic | ..................... | G06F 1/3265 345/501 |
| 2011/0043514 A1* | 2/2011 | Hussain | ................... | G09G 5/18 345/213 |
| 2012/0113498 A1* | 5/2012 | Margerm | ............. | G09G 3/3426 359/290 |
| 2013/0033504 A1* | 2/2013 | Nugent | .................. | G09G 5/363 345/502 |
| 2013/0063414 A1* | 3/2013 | Huang | .................. | G06F 1/3265 345/213 |
| 2013/0145107 A1* | 6/2013 | Sadowski | ............. | G06F 1/3265 711/149 |
| 2017/0323419 A1* | 11/2017 | Holland | ................. | G09G 5/397 |
| 2019/0051269 A1* | 2/2019 | Kwa | ........................ | G09G 5/12 |
| 2020/0335062 A1* | 10/2020 | Huard | ..................... | G09G 5/18 |

OTHER PUBLICATIONS

Notice of Allowance issued in U.S. Appl. No. 17/060,942 dated Feb. 6, 2023, 7 pages.

* cited by examiner

DISPLAY CYCLE CONTROL SYSTEM

CROSS-REFERENCE TO RELATED APPLICATIONS

The present application is a Continuation application of U.S. patent application Ser. No. 16/889,318, entitled "DISPLAY CYCLE CONTROL SYSTEM", and filed on Jun. 1, 2020, the entirety of which is incorporated by reference herein.

BACKGROUND

Video is produced on one or more displays, such as computer monitors, using a stream of frames that are generated by a graphics processing unit (GPU) or other processor. The GPU, a display controller, or both provides or scans out frame data representative of pixels to be displayed at each of the displays. The frame data is stored in one or more respective buffers prior to reading out the pixel values to generate an image on respective screens. The image is image formed of a rectangular grid of pixels having a first number of lines, and with each line having a second number of pixels. In some cases, if insufficient or incorrect frame data is received at the displays, flickering and other visual artifacts occur. Rather than allowing such errors to occur, display systems typically are managed as real-time systems where certain operations are precluded or performed infrequently due to their potential data stream impact. In some systems, the GPU is run using settings that guarantee that frame data sent to the displays at a certain rate. However, running portions or all of the GPU at clock speeds and power levels at all times to account for a certain rate of frame data transfer often consumes an undesirable amount of power. Additionally, some system operations (e.g., memory operations) at the GPU undesirably affect the rate of frame data generation and transmission. However, in some cases, failure to perform such operations for extended amounts of time degrades system performance (e.g., due to an increased error rate).

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

A computer system is to perform one or more system operations (e.g., memory operations or adjusting a clock frequency of a portion of a GPU) that, in some cases, affect the ability of the GPU to transmit display data to one or more displays. In some cases, if the ability to transmit display data is affected when the display data is to be sent for a vertical active period of a display cycle of one of the one or more displays, a display constraint (e.g., a real-time constraint related to visual artifacts or other perturbations) is violated. However, if the ability to transmit display data is affected at a time corresponding to a blanking period (a time where the display is not expecting display data to be scanned in) of the display cycle, in some cases, the display constraint is not violated. In some cases, blanking periods of a display cycle of a display are too short to perform the one or more system operations without affecting the ability to transmit display data for a vertical active period of the display. Additionally, in some cases where the computer system includes multiple displays, blanking periods of the multiple displays do not overlap long enough (or at all) to perform the one or more system operations without affecting the ability to transmit display data for a vertical active period of at least one display.

In various embodiments, as described herein, the computer system modifies a display cycle of at least one of the one or more displays based on a blackout duration. The blackout duration corresponds to a duration of one or more system operations that reduce or eliminate display data availability (e.g., by impacting the ability to transmit display data) to the one or more displays. As a result of modifying the display cycle of the at least one of the one or more displays, the computer system schedules the system operation without affecting transmission of display data for the vertical active period of the at least one display. Accordingly, the computer system performs system operations without violating time constraints (e.g., real-time constraints related to visual perturbations) of the one or more displays. In various embodiments, the system operations provide various benefits such as reducing power consumption of the computer system or improving reliability (e.g., by reducing an error rate) of the computer system.

As described herein, modifying the at least one display cycle includes one or more of various display cycle modification operations. As noted above, in some cases, blanking periods of a display cycle of a display are too short to perform the one or more system operations without affecting transmission of display data for a vertical active period of the display. In some cases, modifying the at least one display cycle includes adjusting one or more blanking periods to equal or exceed the blackout duration. As a result, computer system performs the one or more system operations without affecting the transmission of the display data for the vertical active period.

Additionally, as noted above, in some cases, the display system includes multiple displays. In some embodiments, blanking periods of multiple displays do not overlap long enough (or at all) to perform the one or more system operations (e.g., due to phase differences, differences in video timing, differing display resolutions, differing display rates, etc.) without affecting transmission of display data for a vertical active period of at least one display. In some cases, modifying the at least one display cycle includes synchronizing or otherwise adjusting one or more respective display cycles of the one or more displays so the vertical blanking periods overlap for at least the blackout duration. In some embodiments, a display controller or a GPU outputs a master cycle signal indicative of at least a portion of the display cycle of the mater display. Display cycles of one or more of the displays are adjusted based on the master cycle signal. As a result, blanking periods of the displays are synchronized by a collective synchronization time. Due to the synchronization, blanking periods of the displays overlap for at least the blackout duration. After the collective synchronization time, the computer system performs one or more system operations during the blackout duration. Accordingly, in some cases, the computer system performs the system operation without violating time constraints (e.g., real-time constraints) of the multiple displays.

As used herein, "synchronized" refers to a relative alignment, within a specified amount of time (an error margin), of a specific point in display cycles of two or more displays. For example, in some embodiments, two displays are considered "synchronized" if they begin vertical active periods within a specified amount of time of each other, even if other points in the respective display cycles, such as a beginning of respective vertical blanking periods, are not begun within the specified amount of time of each other, and even if other display cycles, such as every other display cycle for one of the displays, are not begun within the specified amount of time of each other.

Figure 1:
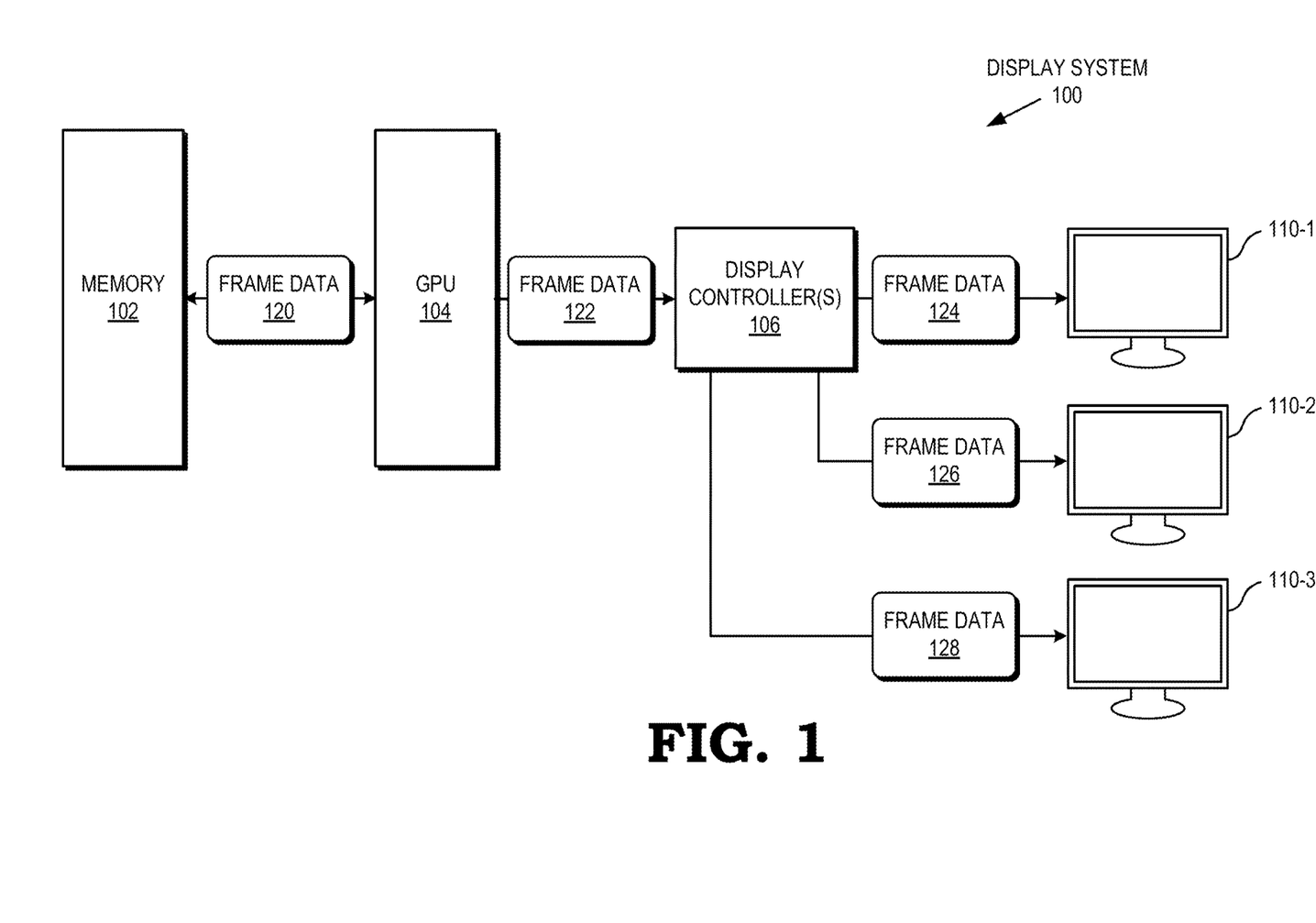
FIG. 1 is a block diagram of a display system that includes a display cycle control system in accordance with some embodiments.

FIG. 1 illustrates a display system 100 in accordance with some embodiments. In the illustrated embodiment, display system 100 includes memory 102, graphics processing unit (GPU) 104, display controller(s) 106, and one or more displays 110, such as the illustrated displays 110-1, 110-2, and 110-3. Although the illustrated embodiment shows a specific configuration of components, in various embodiments, other combinations of components are contemplated. Further, in some embodiments, additional components such as frame buffers are contemplated but not illustrated for ease of discussion. In some embodiments, additional displays (e.g. six displays) or fewer displays (e.g., one display or two displays) are contemplated.

Display system 100 is part of a larger processing system (not shown) including various other components (e.g., processor cores, memory devices, interconnects, etc.) that generate commands and data associated with graphics and other display operations. Based on the received commands and data, GPU 104 performs operations (e.g., vector operations or drawing operations) that generate frame data such as frame data 120. The frame data includes display information to be displayed at one or more of displays 110-1, 110-2, and 110-3.

In the illustrated embodiment, GPU 104 is coupled to memory 102. In some embodiments, memory 102 is implemented as a dynamic random-access memory (DRAM), and in other embodiments, memory 102 is implemented using other types of memory including static random-access memory (SRAM), non-volatile RAM, and the like. In some embodiments, as discussed further below, memory 102 is a non-transitory computer readable medium embodying a set of executable instructions to manipulate at least one processor (e.g., GPU 104) to perform various display cycle control operations. GPU 104 executes instructions and stores information in memory 102 such as frame data 120. For example, memory 102 stores a plurality of previously generated sets of frame data (not shown) received from GPU 104. In some embodiments, GPU 104 includes memory 102.

To display frames, GPU 104 sends frame data 122 (e.g., frame data generated directly by GPU 104 or frame data retrieved from memory 102) to one or more display controller(s) 106. Display controller(s) 106 control the rendering of frames at displays 110-1, 110-2, and 110-3. Accordingly, respective portions of frame data 122 are sent to displays 110-1, 110-2, and 110-3 as frame data 124, 126, and 128, respectively. In some embodiments, frame data 124, 126, and 128 are sent as separate data streams. Alternatively, in some implementations (e.g., when two displays show the same content) same frame data is sent to multiple displays of displays 110-1, 110-2, and 110-3. In some embodiments, display controller(s) 106 perform operations including buffering frame data received from GPU 104 such as frame data 122, adjusting display cycles of one or more of displays 110-1, 110-2, and 110-3 (e.g., by programming different blanking period lengths), and, as further discussed below with reference to FIGS. 3-7, synchronizing display cycles of displays 110-1, 110-2, and 110-3. Although display controller(s) 106 are illustrated as separate from GPU 104 for ease of illustration, in some embodiments, display controller(s) 106 are incorporated in GPU 104. In other embodiments, one or more operations of the display controller(s) 106 are performed at one or more of displays 110-1, 110-2, and 110-3. Further, in the illustrated embodiment, a single display controller 106 corresponds to displays 110-1, 110-2, and 110-3. However, in other embodiments, display system 100 includes a plurality of display controllers 106 (e.g., three display controllers that each correspond to a different display or two display controllers where one display controller corresponds to multiple displays).

Displays 110-1, 110-2, and 110-3 are display devices that display images based on the frames received from GPU 104. In various embodiments, displays 110-1, 110-2, and 110-3 display a same set of images or different images from each other. In different embodiments, displays 110-1, 110-2, and 110-3 are liquid crystal display (LCD) devices, organic light-emitting diode (OLED) devices, and the like. In some embodiments, displays 110-1, 110-2, and 110-3 are different types of devices. For example, in one embodiment, display 110-1 is an LCD device and displays 110-2 and 110-3 are OLED devices. As will be appreciated by one skilled in the art, displays 110-1, 110-2, and 110-3 periodically render (or "draw") the most recent frame received by the display from GPU 104, thereby displaying the frame. As further described below with reference to FIG. 2, displaying frames is performed as part of a display cycle, which includes a vertical active period in which image data is rendered and a vertical blanking period in which image data is not rendered. In some cases, if frames are not received on time for a vertical active period (e.g., because the frames are delayed by a system operation at GPU 104), flickering and other visual artifacts occur.

In some embodiments, one or more of displays 110-1, 110-2, and 110-3 have an adjustable display cycle (e.g., a display cycle that is adjustable within a certain range of timings). As described further herein, in some embodiments, the respective display cycles of displays 110-1, 110-2, and 110-3 are adjusted so that respective vertical blanking periods of displays 110-1, 110-2, and 110-3 overlap for at least a blackout duration. Because frames are not rendered during the vertical blanking periods, in some cases, system operations that would reduce an amount of data provided to displays 110-1, 110-2, and/or 110-3 (system operations that would cause visual artifacts) are performed without causing visual artifacts. Some examples of such system operations include, but are not limited to, one or more of adjusting a clock speed of memory 102, reducing an amount of power provided to memory 102, performing a memory refresh operation at memory 102, performing training at memory 102, changing a mode at memory 102, adjusting a clock speed of GPU 104, reducing an amount of power provided to GPU 104, adjusting a clock speed of display controller(s) 106, reducing an amount of power provided to display controller(s) 106, or an update or training operation for a component such as memory 102 or GPU 104. In some embodiments, the system operations reduce an overall power consumption of display system 100 over time, increase reliability of display system 100, or both.

Figure 2:
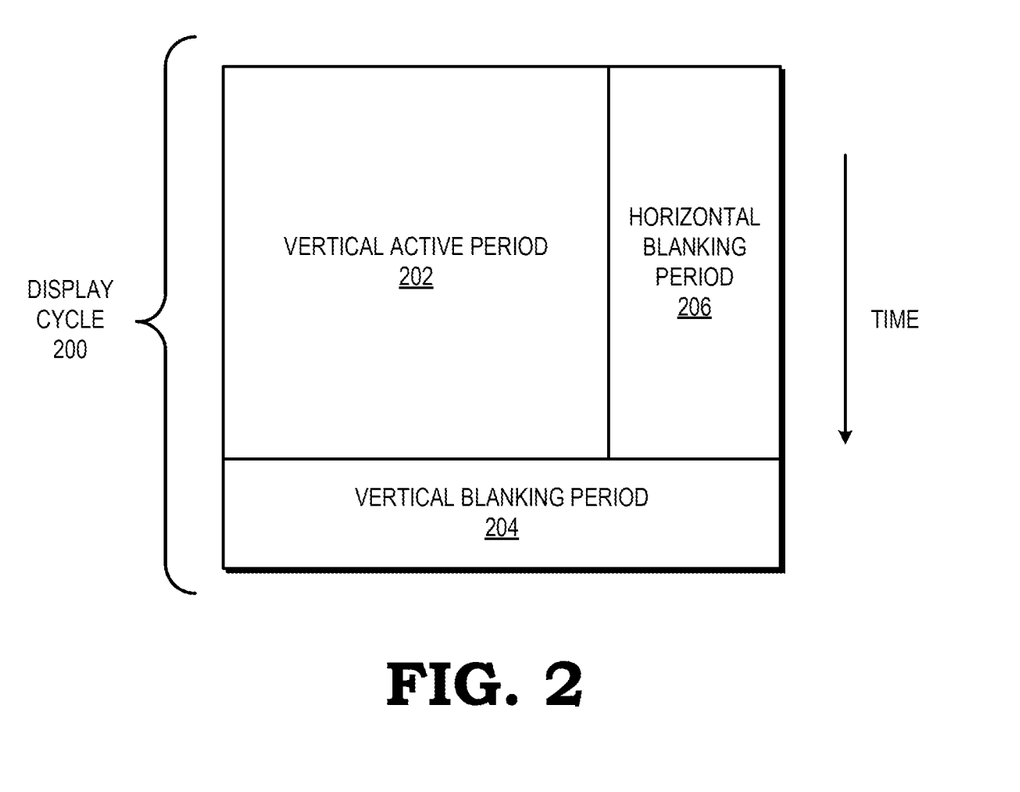
FIG. 2 is a block diagram of an example display cycle in accordance with some embodiments.

FIG. 2 is a block diagram of a display cycle 200 of a display according to some embodiments. Display cycle 200 is partitioned into vertical active period 202, vertical blanking period 204, and horizontal blanking period 206. During vertical active period 202, pixels from a data stream (e.g., frame data 124 of FIG. 1) are displayed at a display as a series of rows. At the end of each row, horizontal blanking period 206 occurs, where the signal retraces from one side of the display to another. After all rows of a frame have been displayed, vertical blanking period 204 occurs, where the signal retraces from a bottom of the display back to the top. The display does not scan in new video information during the blanking periods. Accordingly, in some embodiments, the ability to transmit display data is interrupted during time periods corresponding to blanking periods without causing errors related to insufficient display data. In some cases, the ability to transmit display data is safely interrupted during the blanking periods. In other embodiments such as systems where a display pipeline includes buffers or other hardware that affect the timing of display data, the ability to transmit display data is safely interrupted at other times that are not during the blanking periods but correspond to the blanking periods.

As described herein, a blanking period (e.g., vertical blanking period 204 or horizontal blanking period 206) is increased to equal or exceed a blackout duration corresponding to a duration of one or more system operations. In some cases, the blackout duration is also based on other factors such as interrupt latencies, software execution times, register access time, context switch time, or the execution of higher priority interrupts or tasks. As a result of increasing the blanking period, a system operation that affects the ability to transmit display data is performed during a time period corresponding to the blanking period.

As another example, a synchronization operation is performed by a system including multiple displays. As further discussed below with reference to FIGS. 3, 4, and 6, in various embodiments, display cycle 200 differs for different displays. For example, a display cycle of display 110-1 has a longer vertical active period and a shorter vertical blanking period than a display cycle of display 110-2. As another example, two displays run at different frequencies (e.g., a first display runs at 60 Hz and a second display runs at 30 Hz). In some embodiments, different displays have display cycles that take different amounts of time to complete. Accordingly, in some systems including multiple displays, a synchronization operation is performed so that the blanking periods overlap for at least the blackout duration.

In some embodiments, display cycles of one or more displays are adjusted. For example, display cycle 200 is valid for a display despite adjusting (increasing or decreasing) a duration of vertical active period 202, vertical blanking period 204, horizontal blanking period 206, or any combination thereof. In some cases, displays (e.g., displays 110-1 and 110-2) have display parameters that have different allowed ranges and are only modified within those ranges. For example, in some cases, display cycle 200 for display 110-1 remains valid only if certain parameters are met (e.g., a minimum vertical active period, a maximum vertical active period, a minimum vertical blanking period, a maximum vertical blanking period, a minimum horizontal blanking period, a maximum horizontal blanking period, a minimum cycle duration, a maximum cycle duration, or any combination thereof). However, in some cases, display cycle 200 for display 110-2 remains valid under different parameters. In some cases, the display cycles of the one or more displays are permanently changed. In other cases, the display cycles of at least some of the one or more displays are only temporarily changed.

Figure 3:
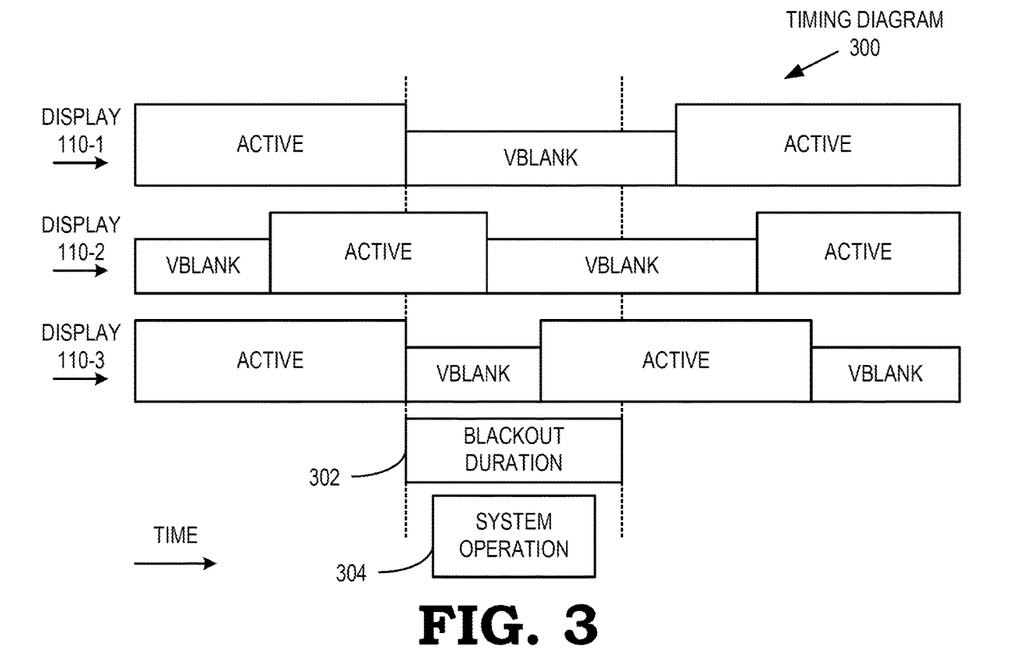
FIG. 3 is a block diagram illustrating an example timing diagram of display cycles of several displays in accordance with some embodiments.
Figure 4:
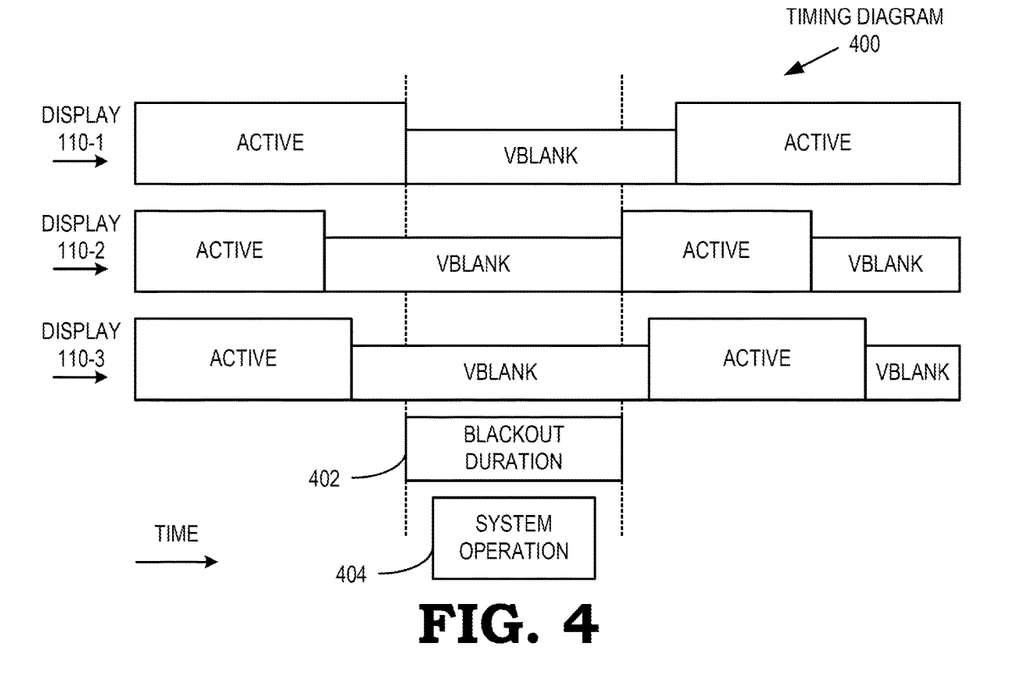
FIG. 4 is a block diagram illustrating another example timing diagram of display cycles of several displays in accordance with some embodiments.

FIGS. 3 and 4 include timing diagrams 300 and 400 that illustrate a display cycle control process to enable a system operation that taking at most a blackout duration in accordance with some embodiments. Timing diagrams 300 and 400 illustrate example display cycles for displays 110-1, 110-2, and 110-3 of FIG. 1.

As illustrated by timing diagram 300, in some cases, displays 110-1, 110-2, and 110-3 have different display cycles where vertical active periods alternate with vertical blanking periods. For clarity, horizontal active periods are not shown but are interspersed within the vertical active periods. In timing diagram 300, the display cycles of displays 110-1, 110-2, and 110-3 include different durations of respective periods. For example, in timing diagram 300, the vertical active periods of displays 110-1 and 110-3 have a same duration but the vertical active period of display 110-2 has a different duration. Additionally, the vertical blanking periods of displays 110-1 and 110-2 have a same duration, but the vertical blanking period of display 110-3 has a different duration. In the illustrated example, the vertical blanking periods of displays 110-1, 110-2, and 110-3 do not overlap for at least blackout duration 302. Further, the vertical blanking periods of the display cycle of display 110-3 do not equal or exceed the example blackout duration 302. As a result, in some cases, performing system operation 304 will cause time constraints of one or more of displays 110-1, 110-2, and 110-3 to be violated, resulting in undesirable errors such as visual perturbations.

As illustrated by timing diagram 400, in some cases, as a result of adjusting display cycles of displays 110-2 and 110-3 from timing diagram 300, the vertical blanking periods of the display cycles of displays 110-1, 110-2, and 110-3 overlap for at least blackout duration 402. More particularly, in the illustrated example, a timing of a display cycle of display 110-2 has changed relative to the display cycle of display 110-1. In various embodiments, this relative timing is changed by adjusting a duration of the vertical active period of display 110-2, adjusting a duration of the vertical blanking period of display 110-2, waiting for a particular amount of time (e.g., a collective synchronization time), or any combination thereof. Additionally, in the illustrated example, a duration of a vertical blanking period of the display cycle of display 110-3 has been increased (e.g., by adjusting a vertical blanking period value in a register at display 110-3). In some embodiments, as further discussed with reference to FIGS. 5 and 6, display cycles of displays 110-1, 110-2, and 110-3 are synchronized. In some cases, vertical blanking periods of displays 110-1, 110-2, and 110-3 overlap every display cycle. In other cases, the vertical blanking periods overlap once every several cycles (e.g., once every two cycles or once every six cycles).

Because the vertical blanking periods overlap for at least blackout duration 402, in the illustrated example, a system operation taking at most blackout duration 402 (e.g., system operation 404) is performed, where the system operation impacts the ability of a GPU (e.g., GPU 104) to transmit display data or otherwise reduces or eliminates availability to display data presented by the displays during vertical active periods of the display cycles. Because the system operation is performed during the overlapping vertical blanking periods of displays 110-1, 110-2, and 110-3, the reduction of availability does not cause certain errors such as visual perturbations at displays 110-1, 110-2, and 110-3. As a result, system operations are performed that reduce power consumption or improve reliability (e.g., by reducing an error rate) of the display system without causing certain errors.

Figure 5:
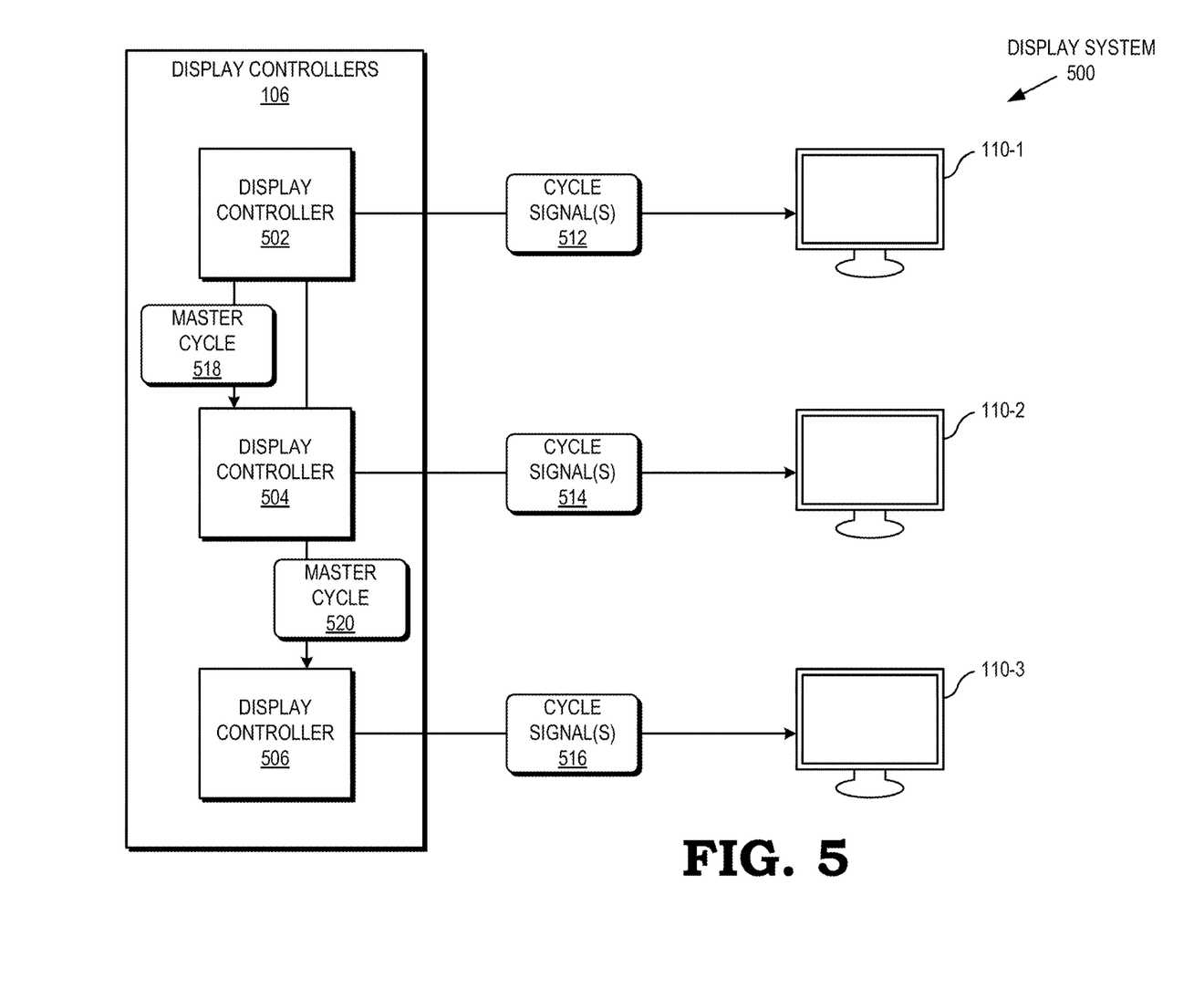
FIG. 5 is a block diagram illustrating an example display cycle control process in accordance with some embodiments.

FIG. 5 is a block diagram illustrating an example display cycle control process of display system 500 in accordance with some embodiments. In the illustrated embodiment, display system 500 includes display controllers 106 and displays 110-1, 110-2, and 110-3 of FIG. 1. Additionally, display controllers 106 includes display controllers 502, 504, and 506, which control and send frame data to respective displays of displays 110-1, 110-2, and 110-3. For example, display controller 502 sends timing data or timing stimuli to display 110-1 resulting in a display cycle (e.g., data that causes display 110-1 to begin one or more blanking periods) as one or more cycle signals 512. Similarly, display controller 504 sends one or more cycle signals 514 to display 110-2 and display controller 506 sends one or more cycle signals 516 to display 110-3.

In the illustrated example, display controllers 106 receive an indication that displays 110-1, 110-2, and 110-3 are to be synchronized. Display 110-1 is designated as a master display and displays 110-2 and 110-3 are designated as slave displays. In various embodiments, display 110-1 is designated as the master display based on measuring a current display cycle of one or more of displays 110-1, 110-2, and 110-3, based on a determination that a display cycle of display 110-1 cannot be adjusted by display controller 502, based on a physical location of display 110-1 (e.g., display 110-1 is a laptop computer screen and displays 110-2 and 110-3 are external displays), based on design properties of one or more of displays 110-1, 110-2, and 110-3 (e.g., displays 110-2 and 110-3 are AMD FreeSync enabled but display 110-1 is not), or based on another criteria.

In response to the indication that displays 110-1, 110-2, and 110-3 are to be synchronized and to designating display 110-1 as the master display, display controller 502 sends one or more master cycle signals 518 to display controller 504 and one or more master cycle signals 520 to display controller 506, indicating the display cycle of display 110-1. In response to one or more master cycle signals 518, display controller 504 computes a corresponding synchronization time, an amount of time it will take to synchronize the display cycle of display 110-2 with the display cycle of display 110-1. Similarly, in response to one or more master cycle signals 520, display controller 506 computes a corresponding synchronization time for display 110-3. One or more of display controllers 106 selects a collective synchronization time that equals or exceeds each of the corresponding synchronization times. Display controller 504 adjusts the display cycle of display 110-2 via one or more cycle signals 514 so displays 110-1 and 110-2 will be synchronized at the collective synchronization time. Similarly, display controller 506 adjusts the display cycle of display 110-3 via one or more cycle signals 516. As further discussed with reference to FIG. 6, in some cases, adjusting the display cycles of displays 110-2 and 110-3 includes one or more of increasing or decreasing a horizontal blanking period or increasing or decreasing a vertical blanking period. As mentioned previously, in some cases, displays 110-1, 110-2, and 110-3 are considered synchronized as long as a particular portion of the display cycles occur within a threshold amount of time (e.g., an amount of time specified by a user, a manufacturer of a display controller, a manufacturer of a GPU, design parameters of the displays, or by another entity) of each other. Due to the adjustments to the display cycles, after waiting at least the collective synchronization time, displays 110-1, 110-2, and 110-3 are synchronized. As a result of the synchronization, in the illustrated embodiment, the vertical blanking periods overlap and a system operation that takes at most a blackout duration is performed. In some cases, displays 110-1, 110-2, and 110-3 become desynchronized at some point after the collective synchronization time (e.g., because they are only synchronized once out of every three vertical blanking periods of display 110-1 or because their display cycles are subsequently adjusted).

In some cases, a threshold time is specified (e.g., by a user, a display driver, basic input/output system (BIOS) or other software executing at the display system 100, or by another computing device) that indicates an amount of time within which the system operation is to be performed. In some cases, the collective synchronization time exceeds the threshold time. In other words, display controllers 106 determine that the vertical blanking periods of displays 110-1, 110-2, and 110-3 cannot overlap for at least the blackout duration within the threshold time. In response to determining that the collective synchronization time, in various embodiments, display controllers 106 cause the system operation to be suspended or otherwise not performed, cause an error to occur, or perform the system operation anyways, accepting that, in some cases, errors occur.

Figure 6:
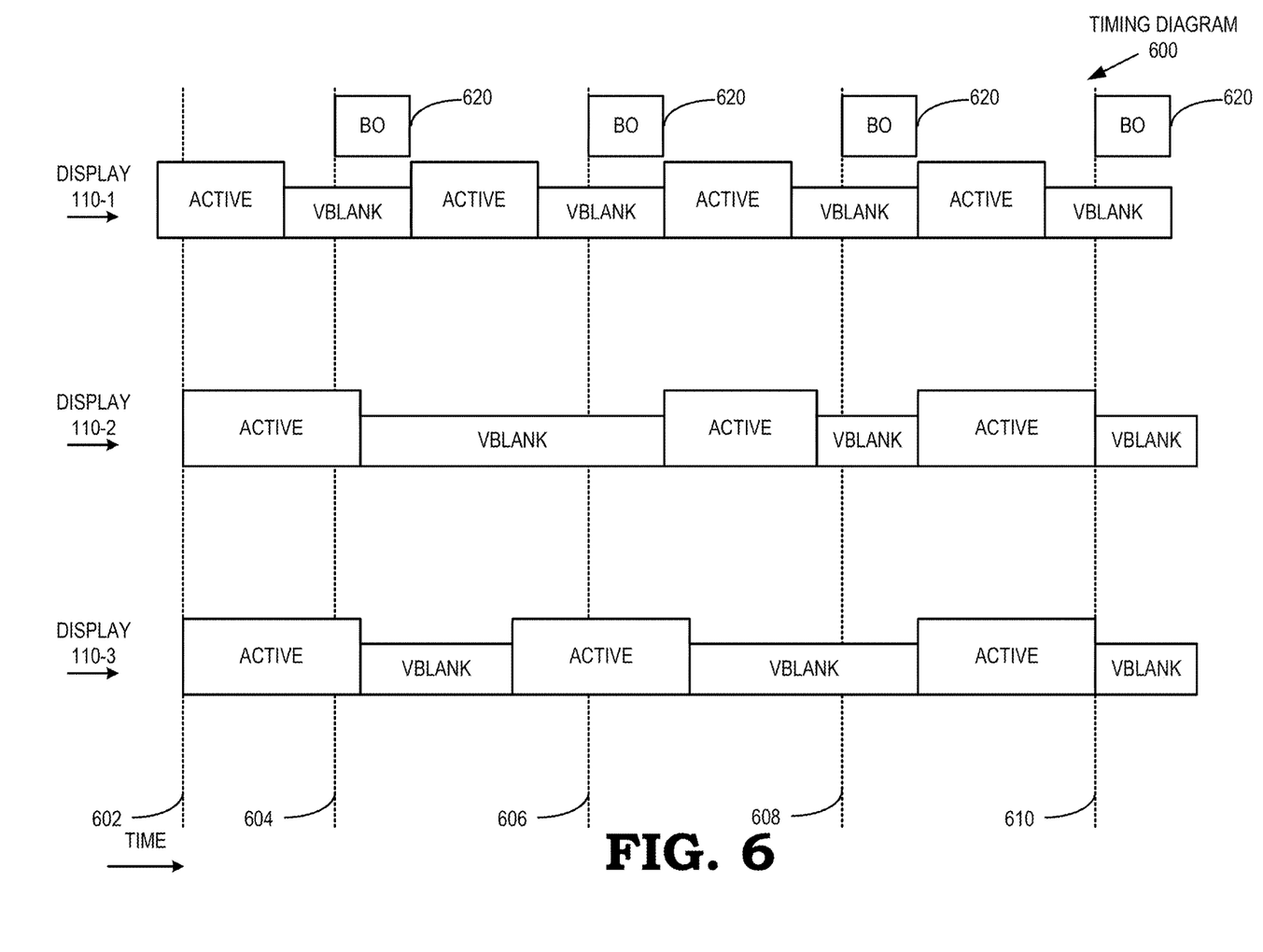
FIG. 6 is a block diagram illustrating an example display cycle control process timing diagram in accordance with some embodiments.

FIG. 6 includes a timing diagram 600 that illustrates a display cycle control process to synchronize display cycles of multiple displays in accordance with some embodiments. Timing diagram 600 illustrates example display cycles for displays 110-1, 110-2, and 110-3 of FIG. 1.

As illustrated by timing diagram 600, similar to timing diagram 300 of FIG. 3, in some cases, displays 110-1, 110-2, and 110-3 have different display cycles where vertical active periods alternate with vertical blanking periods. Similar to FIGS. 3 and 4, horizontal blanking periods are not shown for clarity. As discussed with reference to FIG. 5, display controllers 106 or GPU 104 periodically send cycle signals to displays 110-1, 110-2, and 110-3 that indicate whether the displays should be in a blanking period.

As illustrated by timing diagram 600, prior to time 602, a determination is made to synchronize the display cycles of displays 110-1, 110-2, and 110-3. At time 602, active cycles of displays 110-2 and 110-3 begin. A vertical blanking period of display 110-2 is extended such that at time 606, the display cycles of displays 110-1 and 110-2 are synchronized. Further, subsequent to time 606, the vertical blanking period of display 110-2 is reduced such that at time 610, the display cycles of displays 110-1 and 110-2 remain synchronized. In the illustrated example, display 110-3 is unable to synchronize with display 110-1 by time 606. However, the display cycle of displays 110-1, 110-2, and 110-3 are synchronized at time 608, where an amount of time between time 610 and an end of each of the respective blanking periods exceeds blackout duration 620. As a result, at time 610, the system performs a system operation that reduces display data availability for displays 110-1, 110-2, 110-3, or any combination thereof, without affecting the transmission of display data for the next active period for displays 110-1, 110-2, and 110-3. In other cases, the system operation is performed during a next overlapping vertical blanking period, such as, in the example, at time 610. In some cases, the overlapping vertical blanking periods do not occur every display cycle for at least one of displays 110-1, 110-2, and 110-3.

In some cases, a respective synchronization time for a display (e.g., display 110-3) is calculated based on a portion of the display cycle of the master display. For example, in the illustrated example, an amount of time until the master display will complete a next vertical blanking period minus blackout duration 620 is calculated, resulting in time 604. However, in other examples, this time corresponds to a different portion of the display cycle of the master display, such as a beginning of the master display's next vertical blanking period. If the slave display's display cycle is unable to be adjusted such that blanking periods of the master display and the slave display overlap for at least the blackout duration during the next vertical blanking period of the master display (e.g., due to device constraints on a length of a vertical blanking period of the slave display), then the master display's following vertical blanking period is considered instead. In some embodiments, once a vertical blanking period of the master display is identified where adjustments to the display cycle of the slave display can be made to synchronize with the master display cycle, the respective synchronization time is calculated. As discussed above with respect to FIG. 5, the system operation is scheduled at or subsequent to the synchronization time.

Figure 7:
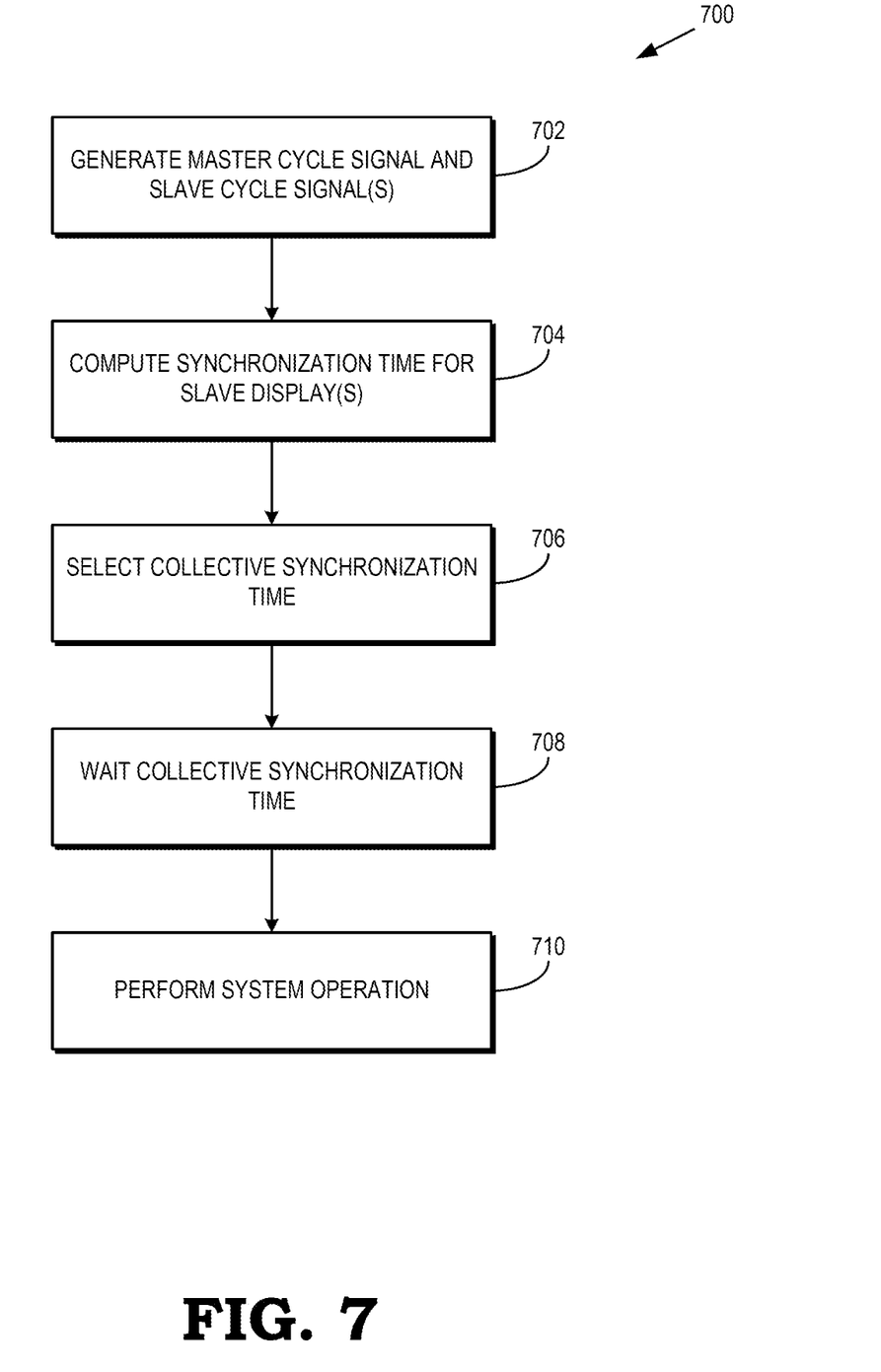
FIG. 7 is a flow diagram illustrating a method of performing a system operation in accordance with some embodiments.

FIG. 7 is a flow diagram illustrating a method 700 of performing a system operation in accordance with some embodiments. Method 700 is implemented by a display system such as display system 100 of FIG. 1. In some embodiments, method 700 is initiated by one or more processors in response to one or more instructions stored by a computer-readable storage medium.

At block 702, the display system generates a master cycle signal and one or more slave cycle signals. For example, in some cases, display controller(s) 106 of display system 100 generate cycle signals 512 and 514 for displays 110-1 and 110-2, respectively. As another example, GPU 104 generates cycle signals 512 and 514. At block 704, the display system computes a respective synchronization time for each of the slave displays. For example, display controller(s) 106 compute a synchronization time for display 110-2.

At block 706, the display system selects a collective synchronization time based on the respective synchronization times. For example, display controller(s) 106 select a collective synchronization time based on the synchronization time for display 110-2. At block 708, the display system waits the collective synchronization time. At that time, the displays are synchronized. At block 710, the display system performs the system operation. For example, memory 102 performs a memory operation that reduces availability of display data to displays 110-1 and 110-2. Accordingly, a method of performing a system operation is depicted.

In some embodiments, a computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. In some embodiments, the computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. In some embodiments, the executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device are not required, and that, in some cases, one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter could be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above could be altered or modified and all such variations are considered within the scope of the disclosed subject matter. Accordingly, the protection sought herein is as set forth in the claims below.

Within this disclosure, in some cases, different entities (which are variously referred to as "components," "units," "devices," etc.) are described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

What is claimed is:

1. A method comprising:
receiving, by a display controller from a graphics processing unit (GPU), frame data to be displayed at one or more slave displays of a plurality of displays;
receiving, by the display controller, one or more master cycle signals indicative of a display cycle of a master display of the plurality of displays;
synchronizing, based on the one or more master cycle signals, display cycles of the one or more slave displays with the display cycle of the master display; and
in response to determining that blanking periods of the plurality of displays overlap for at least a blackout duration, causing a system operation to be performed during overlapping portions of the blanking periods, wherein the system operation reduces availability of display data to the plurality of displays.

2. The method of claim 1, wherein the system operation comprises adjusting a clock speed of a memory that provides the display data to the plurality of displays, reducing an amount of power provided to the memory, performing a memory refresh operation at the memory, performing a memory training operation at the memory, changing a mode at the memory, performing an update operation at the memory, or any combination thereof.

3. The method of claim 1, wherein the system operation comprises adjusting a clock speed of at least a portion of the GPU, reducing an amount of power provided to the GPU, performing an update operation at the GPU, performing a training operation at a component of the GPU, or any combination thereof.

4. The method of claim 1, wherein the system operation comprises adjusting a clock speed of the display controller, reducing an amount of power provided to the display controller, or both.

5. The method of claim 1, wherein receiving the one or more master cycle signals comprises measuring the display cycle of the master display.

6. The method of claim 5, further comprising designating the master display as the master display and the one or more slave displays as slave displays based on measuring the display cycle of the master display.

7. The method of claim 6, wherein designating the master display as the master display is based on a determination that the display cycle of the master display cannot be adjusted by the display controller.

8. The method of claim 1, further comprising designating the master display as the master display and the one or more slave displays as slave displays based on the one or more slave displays being external to a device that includes the master display and the display controller.

9. The method of claim 1, wherein synchronizing the display cycles of the one or more slave displays comprises:
computing, for each slave display, a corresponding synchronization time;
selecting, based on the corresponding synchronization times, a collective synchronization time that equals or exceeds each of the corresponding synchronization times; and
in response to selecting the collective synchronization time, adjusting respective display cycles of the one or more slave displays, wherein determining that the blanking periods of the plurality of displays are synchronized comprises waiting at least the collective synchronization time.

10. A system, comprising:
a display controller configured to receive one or more master cycle signals indicative of a display cycle of a master display of a plurality of displays and, based on the one or more master cycle signals, to synchronize a display cycle of a slave display of the plurality of displays with the display cycle of the master display; and
a graphic processing unit (GPU) configured to send frame data corresponding to an image to be displayed at the slave display to the display controller and to cause a system operation to be performed in response to determining that blanking periods of the master display and the slave display overlap for at least a blackout duration, wherein the system operation prevents the frame data from being sent to the display controller.

11. The system of claim 10, further comprising a second display controller configured to:
receive second frame data from the GPU;
send the second frame data to the master display;
generate the one or more master cycle signals; and
send the one or more master cycle signals to the display controller.

12. The system of claim 11, further comprising a third display controller configured to:
receive third frame data from the GPU;
send the third frame data to a second slave display of the plurality of displays; and
in response to receiving the one or more master cycle signals from the second display controller, synchronize a display cycle of the second slave display with the display cycle of the master display,
wherein the GPU is configured to perform the system operation in response to determining that the blanking periods of the master display, the slave display, and the second slave display overlap for at least the blackout duration.

13. The system of claim 10, wherein the display controller is configured to receive the one or more master cycle signals from the master display.

14. The system of claim 10, wherein the frame data sent from the display controller to the slave display is a first portion of total frame data sent from the GPU to the display controller, and wherein the display controller is further configured to send a second portion of the total frame data to the master display.

15. The system of claim 14, wherein the plurality of displays further comprise a second slave display, wherein the display controller is further configured to:
   send a third portion of the total frame data to the second slave display, and
   in response to receiving the one or more master cycle signals, synchronize a display cycle of the second slave display with a display cycle of the master display, and
   wherein the GPU is configured to perform the system operation in response to determining that the blanking periods of the master display, the slave display, and the second slave display overlap for at least the blackout duration.

16. The system of claim 10, wherein the display controller is further configured to cause the system operation to be suspended or to cause an error in response to a determination that the blanking periods of the master display and the slave display cannot overlap for at least the blackout duration within a threshold time.

17. A non-transitory computer readable medium embodying a set of executable instructions, the set of executable instructions to manipulate at least one processor to:
   receive, from a graphics processing unit (GPU), frame data to be displayed at a slave display of a plurality of displays;
   receive one or more master cycle signals indicative of a display cycle of a master display of the plurality of displays;
   based on the one or more master cycle signals, synchronize a display cycle of the slave display with the display cycle of the master display; and
   in response to determining that blanking periods of the plurality of displays overlap for at least a blackout duration, cause a system operation to be performed during overlapping portions of the blanking periods, wherein the system operation reduces availability of display data to the plurality of displays.

18. The non-transitory computer readable medium of claim 17, wherein the set of executable instructions further manipulate the at least one processor to:
   in response to determining that the blanking periods of the plurality of displays cannot overlap for at least the blackout duration within a threshold time, suspend the system operation.

19. The non-transitory computer readable medium of claim 17, wherein synchronizing the display cycle of the slave display comprises, in response to determining that a duration of a blanking portion of the display cycle of the slave display is shorter than the blackout duration, increasing the duration of the blanking portion to equal or exceed the blackout duration.

20. The non-transitory computer readable medium of claim 19, wherein the blanking portion is a vertical blanking portion of the display cycle.

* * * * *